UNITED STATES PATENT OFFICE.

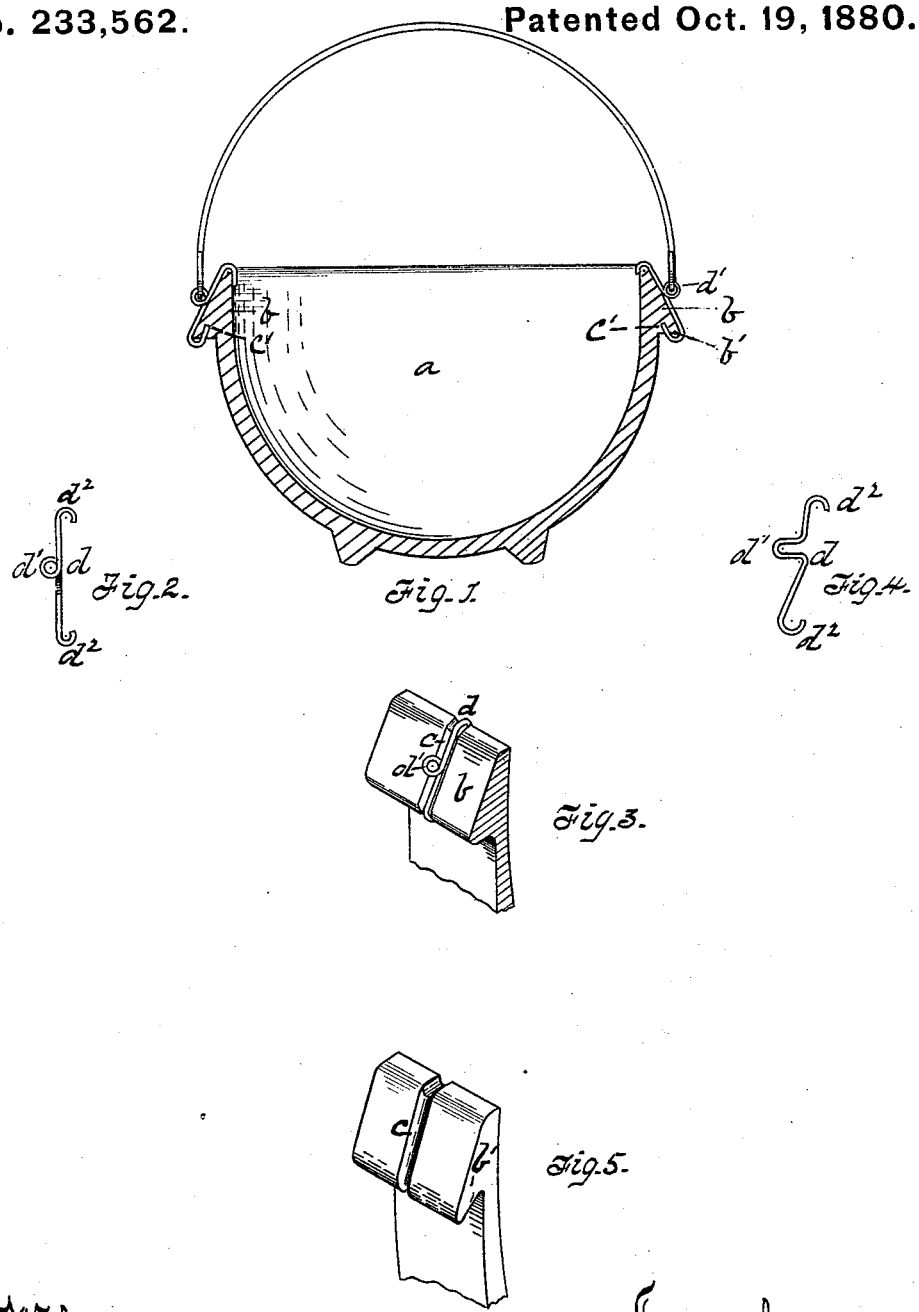

MONTEZUMA SCOTT, OF NEW BRIGHTON, PENNSYLVANIA.

EARTHENWARE VESSEL.

SPECIFICATION forming part of Letters Patent No. 233,562, dated October 19, 1880.

Application filed August 16, 1880. (No model.)

*To all whom it may concern:*

Be it known that I, MONTEZUMA SCOTT, of New Brighton, in the county of Beaver and State of Pennsylvania, have invented a new and useful Improvement in Bail-Lugs for Earthenware Vessels; and I do hereby declare the following to be a full, clear, and exact description thereof, reference being had to the accompanying drawings, forming a part of this specification, in which—

Figure 1 is a sectional view of an earthenware stew-pan fitted with my improved bail-lugs. Figs. 2 and 3 are enlarged views of the lug and the part of the rim to which it is applied; and Fig. 4 illustrates the method of applying it. Fig. 5 shows a modified form of rim for the earthenware vessel.

Like letters of reference indicate like parts in each.

Heretofore great inconvenience and loss have arisen by the breaking off of the bail-lugs of earthenware, glass, and similar fragile vessels; and my invention consists of a wire lug having bent ends, which take over and under the projecting rim of the vessel, and a twisted loop or eye, by which the lug is fastened tightly on the vessel, and is suspended to the bail.

To enable others skilled in the art to make and use my invention, I will now describe its construction and mode of use.

The vessel $a$ is fitted with a rim or bead, $b$, the lower edge, $b'$, of which constitutes a shoulder, under which the lower end of my lug takes its hold. At the proper places on the rim $b$ are grooves $c$, which extend over the upper edge and down to and under the shoulder $b'$, where they terminate in holes $c'$.

The lug $d$ is made of suitable wire twisted to form a loop, $d'$, and bent at the ends to form hooks $d^2$ $d^2$, one of which takes over the edge of the vessel and the other into the hole $c'$ under the shoulder $b'$.

In putting the lug on, the loop $d'$ is untwisted sufficiently to permit the ends to slip on easily, and then it is twisted sufficiently to tighten it firmly to place, the spring of the wire causing it to bind tightly.

The shoulder $b'$ may be made more abrupt and the hole $c'$ changed to a groove, if desired, as shown in Fig. 5.

The advantages of my invention are its cheapness, simplicity in construction and use, and the saving from breakage it effects in vessels.

What I claim as my invention, and desire to secure by Letters Patent, is—

The combination of an earthenware or similar vessel having a projecting rim, and a wire lug having bent ends, which take over and under the projecting rim of the vessel, and a twisted loop or eye, by which the lug is fastened tightly on the vessel and suspended to the bail, substantially as and for the purposes described.

In testimony whereof I have hereunto set my hand.

MONTEZUMA SCOTT.

Witnesses:
 T. B. KERR,
 JAMES H. PORTE.